US008037095B2

(12) United States Patent
Haileselassie et al.

(10) Patent No.: US 8,037,095 B2
(45) Date of Patent: Oct. 11, 2011

(54) DYNAMIC WEBCAST CONTENT VIEWER METHOD AND SYSTEM

(75) Inventors: Welela Haileselassie, Poughkeepsie, NY (US); Lerone W. LaTouche, Poughkeepsie, NY (US); Kelly Malone, San Jose, CA (US); Lesley W. Mbogo, San Jose, CA (US); Ugochukwu Nkoku-charles, Yonkers, NY (US); Devon Glenford Williams, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 358 days.

(21) Appl. No.: 12/025,864

(22) Filed: Feb. 5, 2008

(65) Prior Publication Data
US 2009/0198701 A1 Aug. 6, 2009

(51) Int. Cl.
*G06F 17/30* (2006.01)
(52) U.S. Cl. ........ 707/784; 707/913; 707/914; 707/916; 707/917
(58) Field of Classification Search ............... 707/784, 707/913, 914, 916, 917
See application file for complete search history.

(56) References Cited

U.S. PATENT DOCUMENTS

| | | | | |
|---|---|---|---|---|
| 5,659,793 A * | 8/1997 | Escobar et al. | ............... | 715/202 |
| 5,748,187 A * | 5/1998 | Kim et al. | ............... | 715/201 |
| 5,930,804 A * | 7/1999 | Yu et al. | ............... | 1/1 |
| 6,081,262 A * | 6/2000 | Gill et al. | ............... | 715/202 |
| 6,317,141 B1 * | 11/2001 | Pavley et al. | ............... | 715/732 |
| 6,357,042 B2 * | 3/2002 | Srinivasan et al. | ............... | 725/32 |
| 6,415,326 B1 * | 7/2002 | Gupta et al. | ............... | 709/231 |
| 6,424,793 B1 * | 7/2002 | Setogawa et al. | ............... | 386/95 |
| 6,442,598 B1 * | 8/2002 | Wright et al. | ............... | 709/217 |
| 6,464,140 B1 * | 10/2002 | Weigel | ............... | 235/462.07 |
| 6,594,682 B2 * | 7/2003 | Peterson et al. | ............... | 718/102 |
| 6,738,078 B1 * | 5/2004 | Duncombe | ............... | 715/761 |
| 6,766,319 B1 * | 7/2004 | Might | ............... | 1/1 |
| 6,826,593 B1 * | 11/2004 | Acharya et al. | ............... | 709/203 |
| 7,054,847 B2 * | 5/2006 | Hartman et al. | ............... | 706/12 |
| 7,152,098 B2 * | 12/2006 | Khang | ............... | 709/219 |
| 2001/0020242 A1 * | 9/2001 | Gupta et al. | ............... | 707/501.1 |
| 2002/0010863 A1 * | 1/2002 | Mankefors | ............... | 713/189 |
| 2002/0049727 A1 * | 4/2002 | Rothkopf | ............... | 707/1 |
| 2002/0083473 A1 * | 6/2002 | Agnihotri et al. | ............... | 725/140 |
| 2002/0087496 A1 * | 7/2002 | Stirpe et al. | ............... | 706/45 |
| 2002/0129089 A1 * | 9/2002 | Hegde et al. | ............... | 709/200 |
| 2002/0170062 A1 * | 11/2002 | Chen et al. | ............... | 725/86 |
| 2003/0001880 A1 * | 1/2003 | Holtz et al. | ............... | 345/716 |
| 2003/0037068 A1 * | 2/2003 | Thomas et al. | ............... | 707/200 |
| 2003/0185546 A1 * | 10/2003 | Hirota | ............... | 386/83 |
| 2004/0189696 A1 * | 9/2004 | Shirriff | ............... | 345/738 |
| 2004/0237120 A1 * | 11/2004 | Lewin et al. | ............... | 725/135 |

(Continued)

*Primary Examiner* — James Trujillo
*Assistant Examiner* — William Spieler
(74) *Attorney, Agent, or Firm* — Schmeiser, Olsen & Watts; Anna L. Linne (57) ABSTRACT

A data accessing method and system. The method includes receiving by a computing system from a first user, a first user profile comprising user preference data associated with the first user. The computing system receives and stores Webcast data associated with a Webcast that has been broadcasted for an entity. The Webcast data comprises audio/video data. The computing system receives from the first user, a first request for access to the first Webcast data. The computing system associates the user preference data with a first set of specified portions of the audio/video data. The computing system retrieves a first portion of audio/video data of the first set of specified portions of the audio/video data. The computing system presents the first portion of audio/video data to the first user.

10 Claims, 6 Drawing Sheets

U.S. PATENT DOCUMENTS

2005/0108741 A1* 5/2005 Cookson et al. ............. 720/659
2005/0183109 A1* 8/2005 Basson et al. ..................... 725/4
2007/0132780 A1* 6/2007 Garbow et al. ............... 345/619
2007/0239883 A1* 10/2007 Glenn .......................... 709/231

* cited by examiner

DYNAMIC WEBCAST CONTENT VIEWER METHOD AND SYSTEM

FIELD OF THE INVENTION

The present invention relates to a method and associated system for accessing portions of Webcast data based on a user profile.

BACKGROUND OF THE INVENTION

Accessing specific data from a data stream typically comprises a complicated and inefficient process with little flexibility. A user wishing to request access to only specified data portions of a data stream may be limited to predetermined data portions of the data steam. The predetermined data portions from the data stream may not comprise data portions of interest to the user. Accordingly, there exists a need in the art to overcome at least some of the deficiencies and limitations described herein above.

SUMMARY OF THE INVENTION

The present invention provides a data accessing method comprising:

receiving, by a computing system from a first user, a first user profile comprising first user preference data associated with said first user;

storing, by said computing system, said first user profile;

receiving, by said computing system, first Webcast data associated with a first Webcast broadcasted for an entity, said first Webcast data comprising first audio/video data;

storing, by said computing system, said first Webcast data;

receiving, by said computing system from said first user, a first request for access to said first Webcast data;

retrieving, by said computing system, said first user profile in response to said first request;

associating, by said computing system, said first user preference data with a first set of specified portions of said first audio/video data;

retrieving, by said computing system, a first portion of audio/video data of said first set; and presenting, by said computing system, said first portion of audio/video data to said first user.

The present invention provides a computing system comprising a processor coupled to a computer-readable memory unit, said memory unit comprising instructions that when executed by the processor implement a data accessing method, said method comprising:

receiving, by said computing system from a first user, a first user profile comprising first user preference data associated with said first user;

storing, by said computing system, said first user profile;

receiving, by said computing system, first Webcast data associated with a first Webcast broadcasted for an entity, said first Webcast data comprising first audio/video data;

storing, by said computing system, said first Webcast data;

receiving, by said computing system from said first user, a first request for access to said first Webcast data;

retrieving, by said computing system, said first user profile in response to said first request;

associating, by said computing system, said first user preference data with a first set of specified portions of said first audio/video data;

retrieving, by said computing system, a first portion of audio/video data of said first set; and presenting, by said computing system, said first portion of audio/video data to said first user.

The present invention provides a process for supporting computer infrastructure, said process comprising providing at least one support service for at least one of creating, integrating, hosting, maintaining, and deploying computer-readable code in a computing system, wherein the code in combination with the computing system is capable of performing a data accessing method, said method comprising:

receiving, by said computing system from a first user, a first user profile comprising first user preference data associated with said first user;

storing, by said computing system, said first user profile;

receiving, by said computing system, first Webcast data associated with a first Webcast broadcasted for an entity, said first Webcast data comprising first audio/video data;

storing, by said computing system, said first Webcast data;

receiving, by said computing system from said first user, a first request for access to said first Webcast data;

retrieving, by said computing system, said first user profile in response to said first request;

associating, by said computing system, said first user preference data with a first set of specified portions of said first audio/video data;

retrieving, by said computing system, a first portion of audio/video data of said first set; and presenting, by said computing system, said first portion of audio/video data to said first user.

The present invention advantageously provides a method and associated system capable of accessing specific data from a data stream.

DETAILED DESCRIPTION OF THE INVENTION

Figure 1:
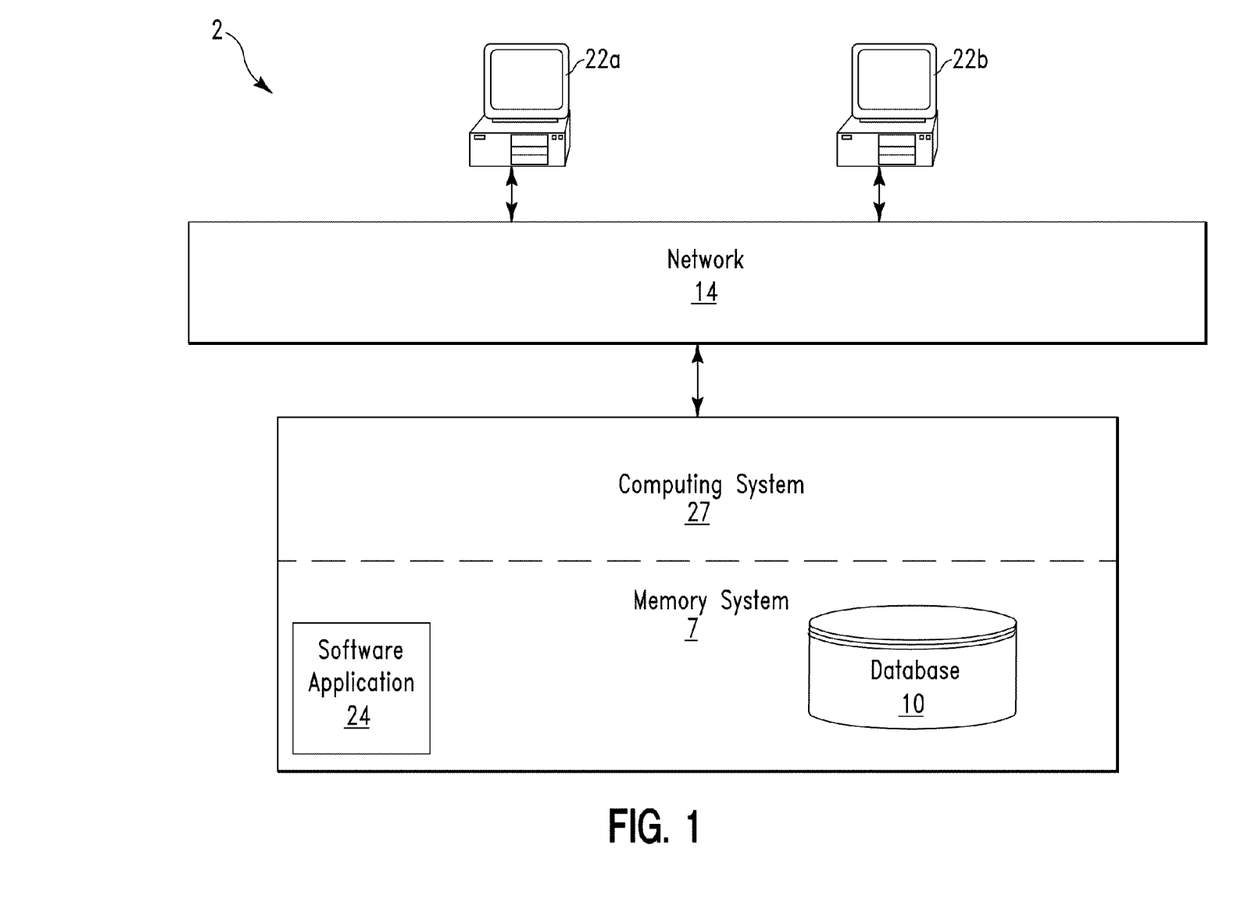
FIG. 1 illustrates a Webcast system for segmenting and accessing portions of Webcast data based on a user profile, in accordance with embodiments of the present invention

FIG. 1 illustrates a Webcast system 2 for segmenting and accessing portions of Webcast data based on a user profile, in accordance with embodiments of the present invention. A Webcast system is defined herein as a computing system used for distributing audio/video content (i.e., data) over the Internet (e.g., network 14) to a plurality of viewers/listeners (e.g., users via terminals 22a and 22b). Alternatively, Webcast system 2 could be replaced by any type of computing network system such as, inter alia, a local area network (LAN) system, a wide area network (WAN) system, etc.

Webcast system 2 comprises a computing system 27, a network 14, and computer terminals 22a and 22b. Terminals 22a and 22b receive Webcast data from computing system 27 through network 14. Note that network 14 in FIG. 1 is described with reference to the Internet but network 14 could alternatively comprise any type of network including, inter alia, a LAN, a WAN, etc. Computing system 27 comprises a memory system 7. Memory system 7 comprises a software application 24 and a database 10. Alternatively, memory system 7 may be located external to computing system 27. Database 10 may comprise a plurality of databases. Software application 24 controls functionality related to a process for accessing portions (i.e., audio, video, text, etc) of Webcast data based on a user profile.

In order to initiate a process for accessing portions of Webcast data (i.e., from previously broadcasted Webcasts) within system 2, a user (i.e., via terminal 22a and or 22b) enters a user profile into computing system 27. The user profile is stored in database 10. The user profile comprises user preferences associated with the user. The user preferences may comprise, inter alia:

1. An organizational unit (i.e., within an entity or company) to which the user currently belongs.
2. Topics of interest preferences based on the user's organizational unit.
3. A date range for viewing previous Webcasts.
4. A time of occurrences when Webcast content was last streamed.
5. Topics of interest preferences based on additional organizational units.

Figures 2, 2A:
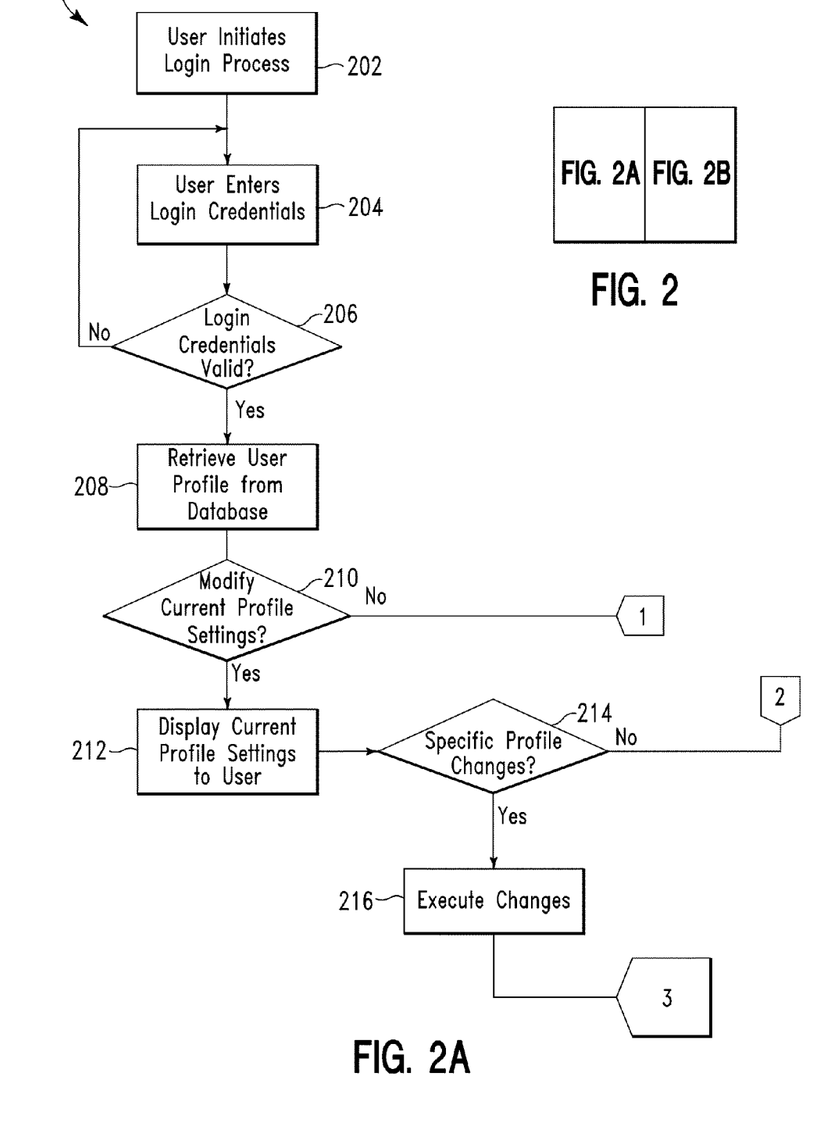
FIGS. 2A and 2B illustrate a flowchart describing an overall algorithm used by the system of FIG. 1 for segmenting and accessing portions of Webcast data based on a user profile, in accordance with embodiments of the present invention.
Figure 2B:
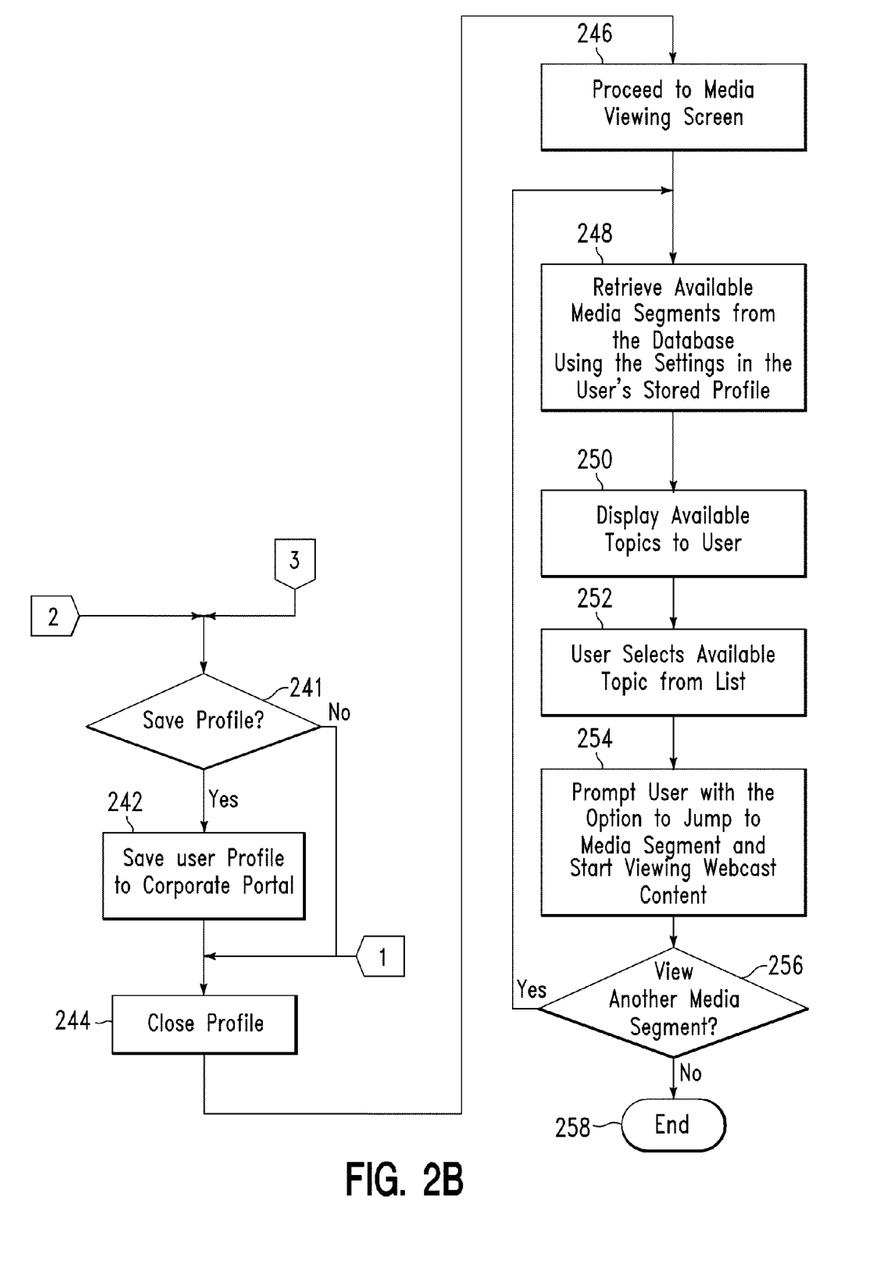

Database 10 comprises stored Webcast data (e.g., audio/video data) from a plurality of previously broadcasted Webcasts. After a user logs into computing system 27, the user makes a request for accessing Webcast data from a specified previously broadcasted Webcast. In response, software application 24 retrieves the user profile from database 10. The user is given an option of modifying his/her user profile (i.e., as described in detail with reference to FIG. 2, infra). After the user profile is retrieved, software application 24 associates user preference data from the user profile with a first set of specified portions of audio/video data from the Webcast data. The first set of specified portions of audio/video data are retrieved from database 10 by software application 24. The first set of specified portions of audio/video data is presented to the user (i.e., via terminal 22a or 22b) in audio format, video format, text format (text format conversion is described in detail with reference to FIG. 2, infra), or any combination thereof.

The following description illustrates an example of implementation for retrieving portions of Webcast data for a user based on a user profile associated with the user.

In this example, a user (i.e., User A) logs onto a website and enters user profile information regarding his/her specific area of work (e.g., a business unit, a work location, internal websites, etc) or interest (e.g., diversity, entertainment, external websites, etc). Based on preferences selected in the user profile information, a user profile is created and transmitted over network 14 to database 10 located on a server (e.g., computing system 27).

Company B delivers Webcast information in the form of a Webcast C. After Webcast C has completed, it is transcribed into text format and text analytics are performed on the transcript. With the use of natural text recognition techniques, the information (i.e., from the transcript) is segmented according to subject matter within the transcript. The segments comprise discrete areas within the transcript that contain similar content. The segments are correlated back to specified areas within Webcast C.

In this example, User A decides to view the content of webcast C and therefore User A logs onto a Company B website. During the login process, User A's profile is uploaded. The profile comprises specific location and business unit information or interests for User A. User A is also prompted to select other interests (e.g., other business unit information or other interests) during the login process. User A selects a format (e.g., video, audio, text, etc) for receiving the content from Company B's webcast C. The format that the user selects is a video format. Therefore, based on User A's profile, new interests, and content delivery choice, content from the segmented Webcast C is delivered to User A in a video format.

FIGS. 2A and 2B illustrate a flowchart describing an overall algorithm used by system 2 of FIG. 1 for segmenting and accessing portions of Webcast data based on a user profile, in accordance with embodiments of the present invention. In step 202, a user initiates a login process (i.e., in order to login to system 2) using a corporate Web portal (e.g., software application 24) to gain access to computing system 27 (i.e., comprising indexed database 10). In step 204, computing system 27 prompts the user to enter his/her login credentials which include a username and a password. In step 206, the corporate web portal determines if the user's login credentials are valid. If in step 206, the corporate web portal determines that the user's login credentials are not valid then step 204 is repeated until the login credentials are valid. If in step 206, the corporate web portal determines that the user's login credentials are valid then in step 208, the user's profile is retrieved from database 10 and displayed to the user on terminal 22a or 22b. In step 210, the user is prompted with the option to modify the current user profile settings. If in step 210, the user does not elect to modify their current user profile, then step 244 is executed as described, infra. If in step 210, the user does elect to modify their current user profile, then in step 212, the entire user profile is displayed (i.e., via terminal 22a or 22b) to the user on a current logon screen. In step 214, the user determines if there are any specific profile changes. If in step 214, the user determines that there are not any specific profile changes then step 241 is executed as described, infra. In step 214, the user determines that there are specific profile changes then in step 216, the specific profile changes are executed. Specific profile changes may include:

1. Changes to a default organizational unit to which the user currently belongs.
2. Changes to any additional organizational units of initial interest to user A.
3. Changes to default topic of interest preferences based on the user's organizational unit.
4. Changes to a date range from a default setting of X number of days.
5. Changes to a time of occurrence when the Webcast content was last streamed for each segment of content.
6. Changes to additional topic of interest preferences based on additional organizational units.

In step 241, it is determined if the modified user profile should be saved. If in step 241, it is determined that the modified user profile should be saved then in step 242, the modified user profile is saved (i.e., in database 10) and closed in step 244. If in step 241, it is determined that the modified user profile should not be saved then in step 244, the modified user profile is closed. In step 246, a media viewing screen (i.e., for Webcast content) is presented to the user. In step 248, all available Webcast content media segments are retrieved from database 10 using the settings from the user's stored profile. In step 250, all available topics of interest for the Webcast content are presented to the user. In step 252, the user selects (from a list of all available topics of interest) Webcast content topics for viewing in the media viewing screen. In step 254, the user is prompted with the option to jump to a specified media segment of the Webcast and to start viewing the Webcast content. In step 256, (after the user has completed viewing the specified media segment) the user is given the option to view another specified media segment from database 10. If in step 256, the user chooses to view another specified media segment from database 10 then step 248 is repeated. If in step 256, the user chooses not to view another specified media segment from database 10 then the process terminates in step 258.

Figure 3:
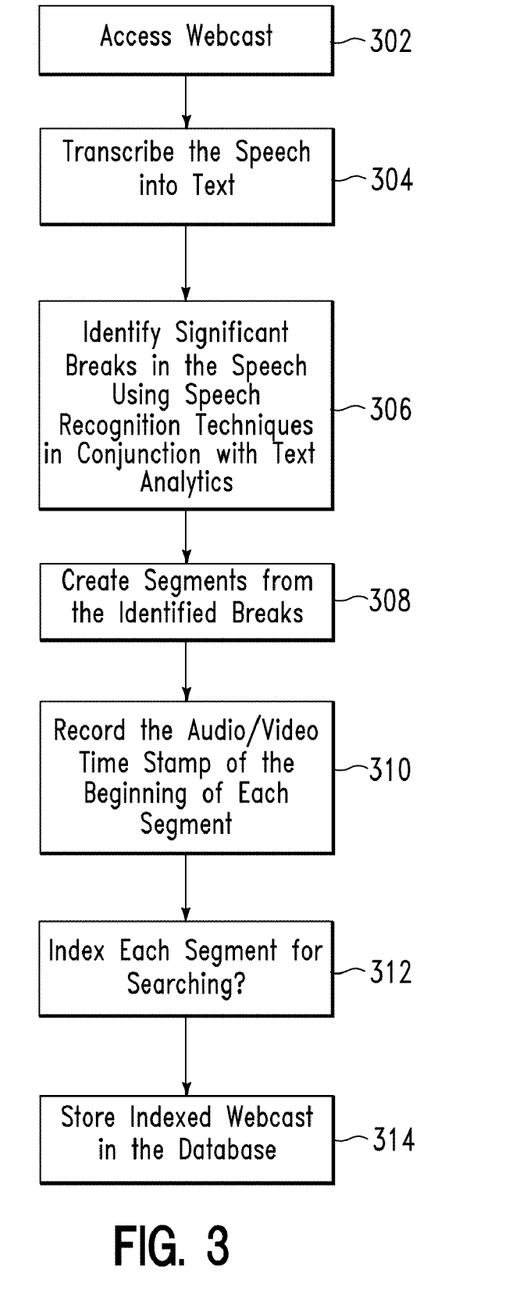
FIG. 3 illustrates a flowchart describing an overall algorithm used by system 2 of FIG. 1 for generating speech segments from Webcast files based on content of the files, in accordance with embodiments of the present invention.

FIG. 3 illustrates a flowchart describing an overall algorithm used by system 2 of FIG. 1 for generating speech segments from Webcast files based on content of the files, in accordance with embodiments of the present invention. In step 302, a user accesses webcast files based on a search profile (e.g., topics, date range, etc) from database 10. In step 304, computing system 27 transcribes the speech content (i.e., audio from the Webcast) into text using speech transcription tools and techniques. In step 306, computing system 27 identifies significant breaks in the speech content using speech recognition techniques in conjunction with text analytics. Analytics technologies such as UIMA may be intelligently designed with domain-specific knowledge of the content being analyzed. Examples of significant breaks could comprise, inter alia, "next is", "now we will talk about second quarter results", etc. In step 308, a segment is generated from the breaks identified in step 306. In step 310, an audio/video time stamp of the beginning of the segment is recorded. The segment format comprises the time stamp in its header, followed by the transcribed text. This time stamp facilitates playback so that media player may seek (i.e., jump to) the beginning of the segment in the media file. The media player is designed to understand this segment format by reading the header and seeking to the segment in the media file. In step 312, the segments are indexed for searching. The indexing allows the user to find a segment associated with a specific topic and play the beginning of that segment. If multiple segments are found as the results of a search, a user interface (e.g., a search engine) will have hyperlinks to each of the results. The contents of the segment, which are available from the transcribed text, are highlighted on the hyperlink for a quick preview. If the preferred delivery method is text format only, the text of the segment of interest is displayed. In step 314, the indexed Webcast is stored in database 10.

Figure 4:
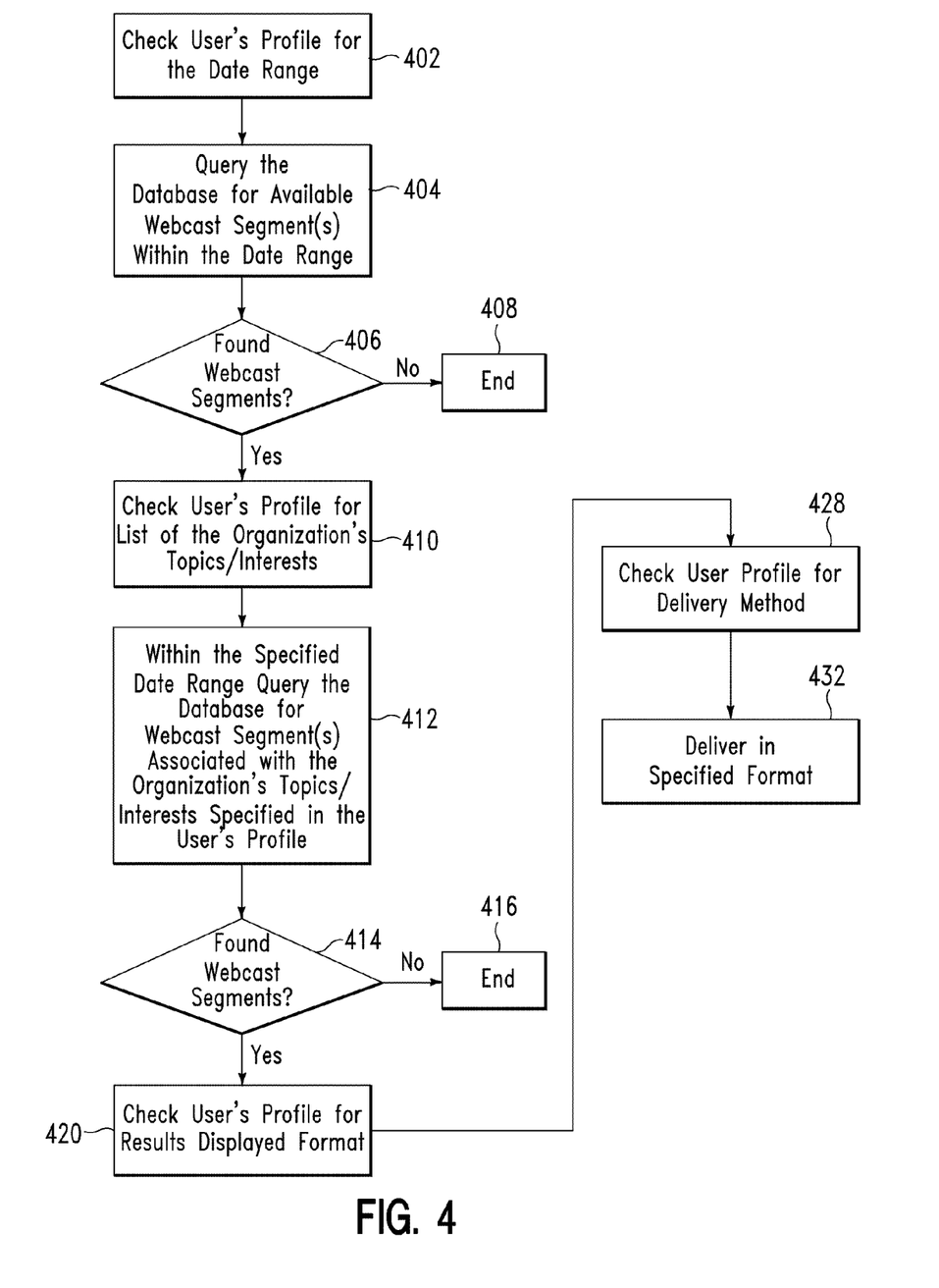
FIG. 4 illustrates a flowchart describing an overall algorithm used by the system of FIG. 1 for retrieving and delivering Webcast segments for a user, in accordance with embodiments of the present invention.

FIG. 4 illustrates a flowchart describing an overall algorithm used by system 2 of FIG. 1 for retrieving and delivering Webcast segments for a user, in accordance with embodiments of the present invention. In step 402, computing system 27 checks the user's profile within a specified date range for:
1. Topics of interest (i.e., for Webcast content).
2. Date range of Webcasts.
3. An order in which the Webcast segments should be displayed (e.g., ascending or descending in date/time).
4. A delivery method for the Webcast segments (e.g., text only, audio only, video only, any combination, etc).

In step 404, computing system 27 scans the indexed webcast content database (e.g., database 10 in FIG. 1) in order to locate a Webcast that was created within the date range specified by the user. In step 406, it is determined if a Webcast is found in step 404. If in step 406, it is determined that a Webcast is not found, then the process terminates in step 408. If in step 406, it is determined that a Webcast is found then in step 410, the user's profile is checked to determine organizations, topics, and interests for the user. In step 412, database 10 is scanned for Webcast content segments(s) associated with the organizations/topics/interests specified in the user's profile. In step 414, it is determined if Webcast content segments(s) associated with the organizations/topics/interests specified in the user's profile and within the specified date range are located in database 10. If in step 414, it is determined that Webcast content segments(s) associated with the organizations/topics/interests specified in the user's profile and within the specified date range are not located in database 10 then the process terminates in step 416. If in step 414, it is determined that a Webcast content segments(s) associated with the organizations/topics/interests specified in the user's profile and within the specified date range are located in database 10 then in step 420, the user profile is checked to determine how the user would like descriptions for the Webcast content segment(s) located in step 412 displayed for the user. The descriptions for the Webcast content segment(s) located in step 412 may displayed for the user by, inter alia, topic (e.g., organization/interest), date (ascending or descending), etc. In step 428, the user profile is checked to determine how (i.e., a specified format) the Webcast content segments(s) located in step 412 will be displayed or presented to the user. In step 432, the Webcast content segments(s) located in step 412 are delivered or presented to the user in a format specified in step 428. The specified format for delivering or presenting the Webcast content segments(s) may comprise any format including, inter alia, an audio format, a video format, a text format, or any combination thereof.

Figure 5:
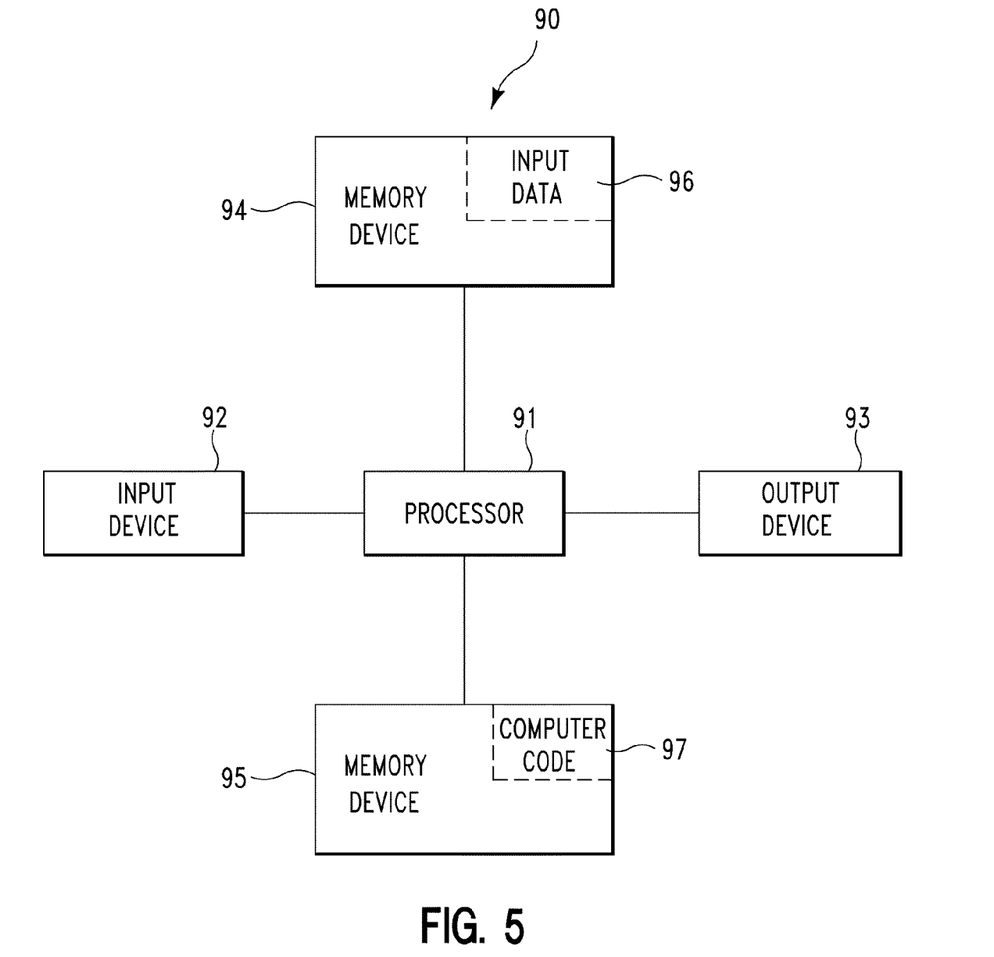
FIG. 5 illustrates a computer apparatus used for segmenting and accessing portions of Webcast data based on a user profile, in accordance with embodiments of the present invention.

FIG. 5 illustrates a computer apparatus 90 (e.g., computing system 27 of FIG. 1) used for segmenting and accessing portions of Webcast data based on a user profile, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2-4) for segmenting and accessing portions of Webcast data based on a user profile. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may comprise the algorithms of FIGS. 2-4 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be deployed, managed, serviced, etc. by a service provider who offers to segment and present portions of Webcast data based on a user profile. Thus the present invention discloses a process for deploying or integrating computing infrastructure, comprising integrating computer-readable code into the computer system 90, wherein the code in combination with the computer system 90 is capable of performing a method for segmenting and accessing portions of Webcast data based on a user profile. In another embodiment, the invention provides a business method that performs the process steps of the invention on a subscription, advertising, and/or fee basis. That is, a service provider, such as a Solution Integrator, could offer to segment and present portions of Webcast data based on a user profile. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A data accessing method comprising:
receiving, by a computing system from a first user via a corporate Web portal, a first user profile comprising first user preference data associated with said first user, said user preference data comprising a default organizational unit within an entity to which said user currently belongs, topics of interest based on said organizational unit, a date range associated with previous Webcasts, a time of occurrence associated with a previous stream of a first Webcast of said previous Webcasts, and topics of interest based on additional organizational units within said entity;
storing, by said computing system, said first user profile;
generating, by said computing system, a specified date range associated with said topics of interest, said date range associated with previous Webcasts, an order in which said previous Webcasts should be presented, and a delivery method for presenting Webcast segments;
modifying within said first user profile, by said computing system, said default organizational unit;
modifying within said first user profile, by said computing system, said additional organizational units;
modifying within said first user profile, by said computing system, default topics of interest associated with said user;
modifying within said first user profile, by said computing system, said date range from a default setting to a specified setting;
receiving, by said computing system, first Webcast data associated with said first Webcast broadcasted for said entity, said first Webcast data comprising first audio/video data;
storing, by said computing system, said first Webcast data;
receiving, by said computing system from said first user, a first request for access to said first Webcast data;
retrieving, by said computing system, said first user profile in response to said first request;
receiving, by said computing system from said first user, a specified format for receiving said first Webcast data, wherein said specified format comprises an audio format, a video format, and a text format;
converting, by said computing system in response to said receiving said specified format, said first audio/video data into audio data, video data, and text data;
associating, by a computer processor of said computing system, said first user preference data with a first set of specified portions of said text data, said audio data, and said video data, said first set of specified portions associated with a specific date range specified and a first type of subject matter in said user profile;
identifying, by said computing system, detected transitional words in said text data and said audio data;
segmenting, by said computing system, said text data into a first plurality of discrete portions in accordance with said first set of specified portions and said detected transitional words in said text data;
segmenting, by said computing system, said audio data and associated portions of said video data into a second plurality of discrete portions in accordance with said first set of specified portions and said detected transitional words in said audio data;
recording, by said computing system, audio/video time stamps in associated headers attached to said first plurality of discrete portions;
search indexing, by said computing system, each portion of said first plurality of discrete portions, wherein said search indexing comprises attaching hyperlinks to each said portion of said first plurality of discrete portions, and wherein each hyperlink of said hyperlinks comprises associated text of said text data;
generating, by said computing system, first description data associated with said topics of interest, said first description data describing said each portion of said first plurality of discrete portions;
presenting, by said computing system to said first user, said first description data and said hyperlinks;
receiving, by said computing system from said first user, a first selection of a first description of said first descriptions, said first description associated with said a first hyperlink of said hyperlinks;
enabling, by said computing system, said first hyperlink;
retrieving, by said computing system based on said first selection, said enabling, said specified date range, an associated time stamp of said audio/video time stamps, and said user profile, a first portion of said first plurality of discrete portions and an associated portion of said second plurality of discrete portions; and
presenting, by said computing system, said first portion and said associated portion to said first user.

2. The method of claim 1, further comprising:
receiving, by said computing system from said first user, a second request for removing said first user preference data from said first user profile;
removing, by said computing system, said first user preference data from said first user profile;
receiving, by said computing system from said first user, second user preference data associated with said first user;
placing, by said computing system, said second user preference data in said first user profile;

receiving, by said computing system from said first user, a second request for access to said first Webcast data;

associating, by said computing system, said second user preference data with a second set of specified portions of said first audio/video data;

retrieving, by said computing system, a second portion of audio/video data of said second set; and presenting, by said computing system, said second portion of audio/video data to said first user.

3. The method of claim 1, further comprising:

receiving, by said computing system, second Webcast data associated with a second Webcast broadcasted for said entity, said second Webcast data comprising second audio/video data;

storing, by said computing system, said second Webcast data;

receiving, by said computing system from said first user, a second request for access to said second Webcast data;

retrieving, by said computing system, said first user profile in response to said second request;

associating, by said computing system, said first user preference data with a second set of specified portions of said second audio/video data;

retrieving, by said computing system, a second portion of audio/video data of said second set; and presenting, by said computing system, said second portion of audio/video data to said first user.

4. The method of claim 1, further comprising:

receiving, by said computing system from a second user, a second user profile comprising second user preference data associated with said second user;

storing, by said computing system, said second user profile;

receiving, by said computing system from said second user, a second request for access to said first Webcast data;

retrieving, by said computing system, said second user profile in response to said second request;

associating, by said computing system, said second user preference data with a second set of specified portions of said first audio/video data;

retrieving, by said computing system, a second portion of audio/video data of said second set; and presenting, by said computing system, said second portion of audio/video data to said second user.

5. A computer program product, comprising a computer storage medium comprising a computer readable program code embodied therein, said computer readable program code configured to perform the method of claim 1 upon being executed by a processor of said computing system.

6. A computing system comprising a computer processor coupled to a computer-readable memory unit, said memory unit comprising instructions that when executed by the processor implement a data accessing method, said method comprising:

receiving, by said computing system from a first user via a corporate Web portal, a first user profile comprising first user preference data associated with said first user, said user preference data comprising a default organizational unit within an entity to which said user currently belongs, topics of interest based on said organizational unit, a date range associated with previous Webcasts, a time of occurrence associated with a previous stream of a first Webcast of said previous Webcasts, and topics of interest based on additional organizational units within said entity;

storing, by said computing system, said first user profile;

generating, by said computing system, a specified date range associated with said topics of interest, said date range associated with previous Webcasts, an order in which said previous Webcasts should be presented, and a delivery method for presenting Webcast segments;

modifying within said first user profile, by said computing system, said default organizational unit;

modifying within said first user profile, by said computing system, said additional organizational units;

modifying within said first user profile, by said computing system, default topics of interest associated with said user;

modifying within said first user profile, by said computing system, said date range from a default setting to a specified setting;

receiving, by said computing system, first Webcast data associated with said first Webcast broadcasted for said entity, said first Webcast data comprising first audio/video data;

storing, by said computing system, said first Webcast data;

receiving, by said computing system from said first user, a first request for access to said first Webcast data;

retrieving, by said computing system, said first user profile in response to said first request;

receiving, by said computing system from said first user, a specified format for receiving said first Webcast data, wherein said specified format comprises an audio format, a video format, and a text format;

converting, by said computing system in response to said receiving said specified format, said first audio/video data into audio data, video data, and text data;

associating, by said computer processor of said computing system, said first user preference data with a first set of specified portions of said text data, said audio data, and said video data, said first set of specified portions associated with a specific date range specified and a first type of subject matter in said user profile;

identifying, by said computing system, detected transitional words in said text data and said audio data;

segmenting, by said computing system, said text data into a first plurality of discrete portions in accordance with said first set of specified portions and said detected transitional words in said text data;

segmenting, by said computing system, said audio data and associated portions of said video data into a second plurality of discrete portions in accordance with said first set of specified portions and said detected transitional words in said audio data;

recording, by said computing system, audio/video time stamps in associated headers attached to said first plurality of discrete portions;

search indexing, by said computing system, each portion of said first plurality of discrete portions, wherein said search indexing comprises attaching hyperlinks to each said portion of said first plurality of discrete portions, and wherein each hyperlink of said hyperlinks comprises associated text of said text data;

generating, by said computing system, first description data associated with said topics of interest, said first description data describing said each portion of said first plurality of discrete portions;

presenting, by said computing system to said first user, said first description data and said hyperlinks;

receiving, by said computing system from said first user, a first selection of a first description of said first descriptions, said first description associated with said a first hyperlink of said hyperlinks;

enabling, by said computing system, said first hyperlink;
retrieving, by said computing system based on said first selection, said enabling, said specified date range, an associated time stamp of said audio/video time stamps, and said user profile, a first portion of said first plurality of discrete portions and an associated portion of said second plurality of discrete portions; and
presenting, by said computing system, said first portion and said associated portion to said first user.

7. The computing system of claim 6, wherein said method further comprises:
receiving, by said computing system from said first user, a second request for removing said first user preference data from said first user profile;
removing, by said computing system, said first user preference data from said first user profile;
receiving, by said computing system from said first user, second user preference data associated with said first user;
placing, by said computing system, said second user preference data in said first user profile;
receiving, by said computing system from said first user, a second request for access to said first Webcast data;
associating, by said computing system, said second user preference data with a second set of specified portions of said first audio/video data;
retrieving, by said computing system, a second portion of audio/video data of said second set; and
presenting, by said computing system, said second portion of audio/video data to said first user.

8. The computing system of claim 6, wherein said method further comprises:
receiving, by said computing system, second Webcast data associated with a second Webcast broadcasted for said entity, said second Webcast data comprising second audio/video data;
storing, by said computing system, said second Webcast data;
receiving, by said computing system from said first user, a second request for access to said second Webcast data;
retrieving, by said computing system, said first user profile in response to said second request;
associating, by said computing system, said first user preference data with a second set of specified portions of said second audio/video data;
retrieving, by said computing system, a second portion of audio/video data of said second set; and
presenting, by said computing system, said second portion of audio/video data to said first user.

9. The computing system of claim 6, wherein said method further comprises:
receiving, by said computing system from a second user, a second user profile comprising second user preference data associated with said second user;
storing, by said computing system, said second user profile;
receiving, by said computing system from said second user, a second request for access to said first Webcast data;
retrieving, by said computing system, said second user profile in response to said second request;
associating, by said computing system, said second user preference data with a second set of specified portions of said first audio/video data;
retrieving, by said computing system, a second portion of audio/video data of said second set; and
presenting, by said computing system, said second portion of audio/video data to said second user.

10. A process for supporting computer infrastructure, said process comprising providing at least one support service for at least one of creating, integrating, hosting, maintaining, and deploying computer-readable code in a computing system comprising a computer-readable memory unit, wherein the code in combination with the computing system is capable of performing data accessing method, said method comprising:
receiving, by said computing system from a first user via a corporate Web portal, a first user profile comprising first user preference data associated with said first user, said user preference data comprising a default organizational unit within an entity to which said user currently belongs, topics of interest based on said organizational unit, a date range associated with previous Webcasts, a time of occurrence associated with a previous stream of a first Webcast of said previous Webcasts, and topics of interest based on additional organizational units within said entity;
storing, by said computing system, said first user profile;
generating, by said computing system, a specified date range associated with said topics of interest, said date range associated with previous Webcasts, an order in which said previous Webcasts should be presented, and a delivery method for presenting Webcast segments;
modifying within said first user profile, by said computing system, said default organizational unit;
modifying within said first user profile, by said computing system, said additional organizational units;
modifying within said first user profile, by said computing system, default topics of interest associated with said user;
modifying within said first user profile, by said computing system, said date range from a default setting to a specified setting;
receiving, by said computing system, first Webcast data associated with said first Webcast broadcasted for said entity, said first Webcast data comprising first audio/video data;
storing, by said computing system, said first Webcast data;
receiving, by said computing system from said first user, a first request for access to said first Webcast data;
retrieving, by said computing system, said first user profile in response to said first request;
receiving, by said computing system from said first user, a specified format for receiving said first Webcast data, wherein said specified format comprises an audio format, a video format, and a text format;
converting, by said computing system in response to said receiving said specified format, said first audio/video data into audio data, video data, and text data;
associating, by a computer processor of said computing system, said first user preference data with a first set of specified portions of said text data, said audio data, and said video data, said first set of specified portions associated with a specific date range specified and a first type of subject matter in said user profile;
identifying, by said computing system, detected transitional words in said text data and said audio data;
segmenting, by said computing system, said text data into a first plurality of discrete portions in accordance with said first set of specified portions and said detected transitional words in said text data;
segmenting, by said computing system, said audio data and associated portions of said video data into a second plurality of discrete portions in accordance with said first set of specified portions and said detected transitional words in said audio data;

recording, by said computing system, audio/video time stamps in associated headers attached to said first plurality of discrete portions;

search indexing, by said computing system, each portion of said first plurality of discrete portions, wherein said search indexing comprises attaching hyperlinks to each said portion of said first plurality of discrete portions, and wherein each hyperlink of said hyperlinks comprises associated text of said text data;

generating, by said computing system, first description data associated with said topics of interest, said first description data describing said each portion of said first plurality of discrete portions;

presenting, by said computing system to said first user, said first description data and said hyperlinks;

receiving, by said computing system from said first user, a first selection of a first description of said first descriptions, said first description associated with said a first hyperlink of said hyperlinks;

enabling, by said computing system, said first hyperlink;

retrieving, by said computing system based on said first selection, said enabling, said specified date range, an associated time stamp of said audio/video time stamps, and said user profile, a first portion of said first plurality of discrete portions and an associated portion of said second plurality of discrete portions; and presenting, by said computing system, said first portion and said associated portion to said first user.

* * * * *